(12) United States Patent
Kowalchik et al.

(10) Patent No.: US 6,973,537 B1
(45) Date of Patent: Dec. 6, 2005

(54) DISK CACHE INTERFACING SYSTEM AND METHOD

(75) Inventors: Michael Kowalchik, Arlington, MA (US); John Cardente, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 333 days.

(21) Appl. No.: 10/001,317

(22) Filed: Oct. 23, 2001

(51) Int. Cl.[7] .............................................. G06F 12/00
(52) U.S. Cl. ....................................... 711/129; 711/113
(58) Field of Search .................... 710/26, 52; 711/113, 711/119, 129, 161; 714/6, 16, 20, 22; 365/228; 713/300

(56) References Cited

U.S. PATENT DOCUMENTS

| | | | | |
|---|---|---|---|---|
| 3,959,778 A | * | 5/1976 | Brette | 714/22 |
| 5,195,100 A | * | 3/1993 | Katz et al. | 714/22 |
| 5,721,956 A | * | 2/1998 | Martin et al. | 710/52 |
| 5,754,888 A | * | 5/1998 | Yang et al. | 710/52 |
| 5,787,466 A | * | 7/1998 | Berliner | 711/117 |
| 5,805,787 A | * | 9/1998 | Brant et al. | 714/6 |
| 5,890,207 A | * | 3/1999 | Sne et al. | 711/113 |
| 5,911,779 A | * | 6/1999 | Stallmo et al. | 714/6 |
| 5,933,853 A | * | 8/1999 | Takagi | 711/159 |
| 6,101,576 A | * | 8/2000 | Kobayashi et al. | 711/122 |
| 6,389,510 B1 | * | 5/2002 | Chen et al. | 711/113 |

OTHER PUBLICATIONS

The RAID Book, Sixth Ed., 1997. pp xiv-xvii, 15-17, 42-43, 50-51, 62-63, 84-91.*
Andrew S. Tannenbaum, Modern Operating Systems, Published 2001, pp.: 300-306.
Web Site: http://www.pcwebopaedia.com/TERM/D/dick_cache.html, "Disk Cache", Last Revised: May 15, 1998 (Publication date unknown).
Title: Symmetrix 8000: Product Description Guide.

* cited by examiner

*Primary Examiner*—Chirstian P. Chace
(74) *Attorney, Agent, or Firm*—Chapin & Huang, L.L.C.; David E. Huang, Esq.

(57) ABSTRACT

In general, in one aspect, the disclosure describes a cache that includes interface that receives data access requests that specify respective data storage addresses, a back-end interface that can retrieve data identified by the data storage addresses, cache storage formed by at least two disks, and a cache manager that services at least some of the requests received at the front-end interface using data stored in the cache storage.

37 Claims, 8 Drawing Sheets

DISK CACHE INTERFACING SYSTEM AND METHOD

This application relates to U.S. patent Application Serial No. 10/004,090, entitled "Data Storage Device", filed on the same day as this application, and incorporated by reference herein.

BACKGROUND

Computer storage devices vary widely in their characteristics. For example, memory chips can quickly respond to requests to store or retrieve data. Most chips that permit data storage and retrieval, however, require some amount of electricity to "remember" the stored data. Computer disks, on the other hand, generally remember stored data even without power. Additionally, a disk typically stores much more data than a chip. Unfortunately, due to their mechanical components, traditional disks are often appreciably slower than other storage mediums.

In many ways, a computer disk is much like an old fashioned record player. That is, most disks include a platter spun by a rotating spindle. A disk head, controlled by a disk head actuator, moves about the spinning platter reading or writing information in different platter locations. Thus, to read or write data, the disk head actuator moves the disk head to await the location of interest to spin underneath.

A variety of techniques have been devised to mask the comparatively slow speed of disks. For example, many systems feature a cache (pronounced "cash") formed from one or more memory chips (e.g., DRAM chips). The cache stores a changing subset of information also stored by a disk. When the cache holds a requested block of data, the cache can quickly respond to a request without awaiting disk retrieval.

SUMMARY

In general, in one aspect, the disclosure describes a cache that includes a front-end interface that receives data access requests that specify respective data storage addresses, a back-end interface that can retrieve data identified by the data storage addresses, cache storage formed by at least two disks, and a cache manager that services at least some of the requests received at the front-end interface using data stored in the cache storage.

Embodiments may include one or more of the following features. The front-end interface may conform to a protocol such as SCSI (Small Computer System Interface), Fibre Channel, INFINIBAND, and/or IDE (Integrated Device Electronics). The disks may have platters less than 3.5 inches in diameter such as 2.5 inch, 1.8 inch, and/or 1 inch diameter platters. The cache may implement a RAID (Redundant Array of Independent Disks) scheme using the disks. The cache may request data from a back-end storage system, retrieve requested data from the disks, send data to the back-end system for writing, determine the location of back-end system data within the disks, and/or remove data from the disks.

The addresses may specify storage locations of a back-end storage system that includes a collection of one or more disks. The data storage addresses may be within an address space, for example, of back-end storage or of a different cache. The requests may be I/O (Input/Output) requests.

In general, in another aspect, the disclosure describes a method of servicing data access requests at a cache having cache storage formed by at least two disks. The method includes receiving the data access requests that specify different respective data storage addresses and servicing at least some of the requests using data stored in the disks.

In general, in another aspect, the disclosure describes a data storage system that includes a back-end storage system having an address space where addresses in the address space identify blocks of storage. The system also includes a cache for the back-end storage system that has a lesser storage capacity than the back-end storage system. The cache includes a front-end interface that receives I/O (Input/Output) requests that specify respective addresses of back-end storage blocks, a back-end interface that communicates with the back-end storage system, cache storage formed by at least two disks having platter diameters less than 3.5 inches, and a cache manager that services at least some of the I/O requests received via the front-end interface using blocks temporarily stored in the cache storage.

DETAILED DESCRIPTION

Disk capacities have grown enormously, doubling roughly every 18 months. Unfortunately, disk access rates have generally failed to keep pace with this growth, doubling only every 34 months. This growing gap between drive capacity and access rates implies that although disk drives can hold more data, the data cannot be accessed as often. A cache can help mask the growing disparity between disk capacities and data access rates by temporarily storing "hot" (e.g., frequently accessed) disk data. Generally, the effectiveness of a cache depends on the size of the cache relative to the amount of data accessed through it. While increasing the size of a cache can help speed data access, construction of larger memory-based caches can be costly due to the expense of memory chips.

Figure 1:
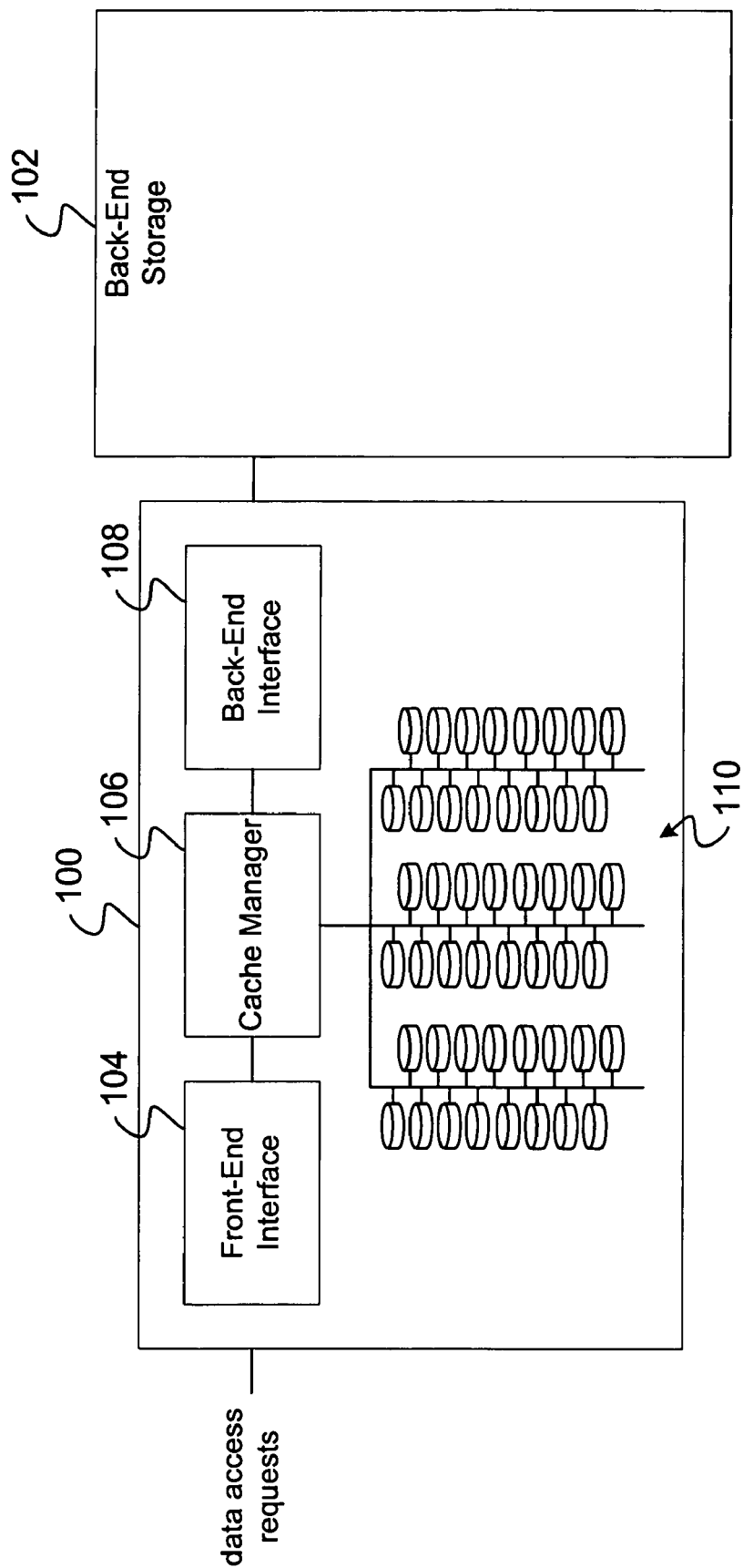
FIG. 1 is a diagram illustrating a cache.

FIG. 1 illustrates a cache 100 that uses a collection of disks 110 for cache storage instead of volatile memory. Since the slow speed of disks usually contributes to the need for a cache 100, a cache 100 featuring disks 110 may seem counter-intuitive. However, spreading cached data across a large number of disks 110 in the cache 100 can increase the number of disks 110 involved in responding to a set of requests. While the delay associated with the mechanics of accessing data from an individual disk 110 may remain unchanged, spreading cached data across the disks 110 increases the number of disks simultaneously seeking information and can increase overall transaction rates. In other words, while increasing the number of spindles and independently actuated read/write heads may not necessarily increase the servicing of a single request, amassing the spindles may increase the performance of a cache handling multiple requests.

A cache 100 using the collection of disks 110 can potentially offer a number of advantages. For example, a larger cache may be constructed more cheaply than a similarly sized cache constructed from memory. Additionally, the disks 110 can preserve data without power, potentially eliminating a need for backup power often featured in memory-based cache systems. Further, as described below, the disks 110 may feature better power and thermal characteristics than a cache constructed from memory. These and other potential advantages are described below.

In greater detail, FIG. 1 illustrates an example of a system that uses a cache 100 to service requests for back-end storage 102. Back-end storage 102 may be constructed from a wide variety of devices such as disks and/or memory chips. For example, the back-end storage 102 may be a large storage subsystem formed by a collection of disks.

As shown, the cache 100 includes a front-end interface 104 that communicates with hosts (e.g., a remote computer), or other components. For example, the front-end interface 104 may receive an Input/Output (I/O) request for a block of back-end storage 102 specified by a data storage address. While not a requirement, the interface 104 may conform to a wide variety of different interconnectivity and communications protocols such as SCSI (Small Computer System Interface), Fibre Channel, or INFINIBAND. Thus, the interface 104 can present a standard front-end offered by a variety of other devices. The interface 104 can hide details of cache 100 construction. That is, a host or other system component need not have any knowledge that the cache 100 uses disks 110 for cache storage instead of memory.

As shown, the cache 100 also includes a back-end interface 108 that communicates with back-end storage 102. For example, the back-end interface 108 can communicate with back-end storage 102 to request data not currently stored in the cache 100 disks 110. The back-end interface 108 may also conform to a wide variety of communication standards used by back-end storage systems 102 such as SCSI, Fibre Channel, and so forth.

The cache manager 106 implements cache logic. For example, the manager 106 can track the continually changing set of data cached by the disks 110, determine if requests can be satisfied by the cache 100 disks 110, forward commands to the back-end interface 108 to store or retrieve back-end storage 102 data, instruct the front-end interface 104 how to respond to the request, and so forth. The caching operations described above are merely examples of caching features and not an exhaustive list. The cache 100 can be configured to use a vast number of other caching techniques.

To store and retrieve data from the cache 100 disks 110, the manager 106 may use a wide variety of techniques. For example, the manager 106 may implement a RAID (Redundant Array of Independent Disk) scheme to improve the performance of the disk 110 array and/or protect against media failure. Different RAID schemes can feature different combinations of techniques known as striping, mirroring, and error correction.

RAID schemes that use striping divide data being stored into different portions and store the portions on different disks 110. For example, striping of the data "EMC Corporation" may result in "EMC C" being stored in a first disk, "orpor" in a second disk, and "ation" in a third disk. To retrieve the data, all three disks can operate concurrently. For example, disks 1, 2, and 3 may all simultaneously seek their portion of the "EMC Corporation" data. Thus, a block of back-end storage data may be distributed across multiple disks.

RAID schemes that use mirroring store copies of data on different disks. For example, two different disks may store a copy of the data "EMC Corporation". While storing data requires writing the information to both disks, the data can be retrieved from either device. For example, if one device is busy, the other can be used to retrieve the data. Mirroring also provides an increased measure of security. For example, if one disk malfunctions the other disk can be used.

Many RAID schemes also feature error correction/detection techniques. For example, many RAID schemes store an error correction code such as a Hamming Code for data being stored. The code can be used to reconstruct data even though some error occurred.

Alternatively, the manager 106 may use data storage techniques other than RAID. For example, the manager 106 may map different address ranges to different cache disks 100. Again, such a technique can increase the likelihood that different disks 110 will concurrently seek requested data.

A variety of disks 110 may be accessed by the cache 100. Each disk may feature its own spindle and independently operating disk head actuator. Alternatively, a portion of the disks 110 may share a common spindle and actuator. While the cache 100 may feature standard 3.5-inch diameter platter drives 110, the cache 100 may instead feature a large collection of ultra-dense, small capacity drives 110 having smaller platters. For example, the cache 100 may be assembled from 2½-inch or 1.8-inch diameter platter disks typically produced for laptop computers. The cache 100 may also be assembled from even smaller devices such as IBM's MicroDrive™ that features a 1-inch platter, roughly the size of a quarter.

Using disks 110 in the cache 100 can offer a number of potential benefits over conventional memory-based caches. For example, current memory technology (e.g., a 128 MB DIMM) dissipates approximately 26 mWatts per MB. In comparison, a typical currently available disk drive only dissipates approximately 0.63 mWatts per MB. Thus, using disks 110 instead of memory may substantially lessen the need for costly, high performance cooling systems that can place practical limits on the size of memory-based caches. Additionally, due to the lower capacity cost and power dissipation of disks 110, it is possible to build much larger caches than what may be practical with memory based approaches. The lower power dissipation of the disks 110 can potentially permit larger caches to be packed into much smaller volumes than those based on memory technologies.

Though described in FIG. 1 as having independent components 104, 106, 108, an implementation may feature a monolithic design having a processor that executes instructions for the front-end interface 104, back-end interface 108, and cache manager 106. Additionally, the cache 100 may provide other features. For example, the back-end manager 108 may be configured to manage components (e.g., disks) of back-end storage 102.

The cache 100 may provide or be configured with disk interfaces (e.g., SCSI or IDE [Integrated Disk Electronics]) that allow a system manager to attach disks to the cache 100 as desired. For example, a system manager may add disks to increase the size of a cache. Co-pending U.S. patent application Ser. No. 10/004,090, entitled "Data Storage Device", describes a sample implementation of a multi-disk device in greater detail.

Figure 2:
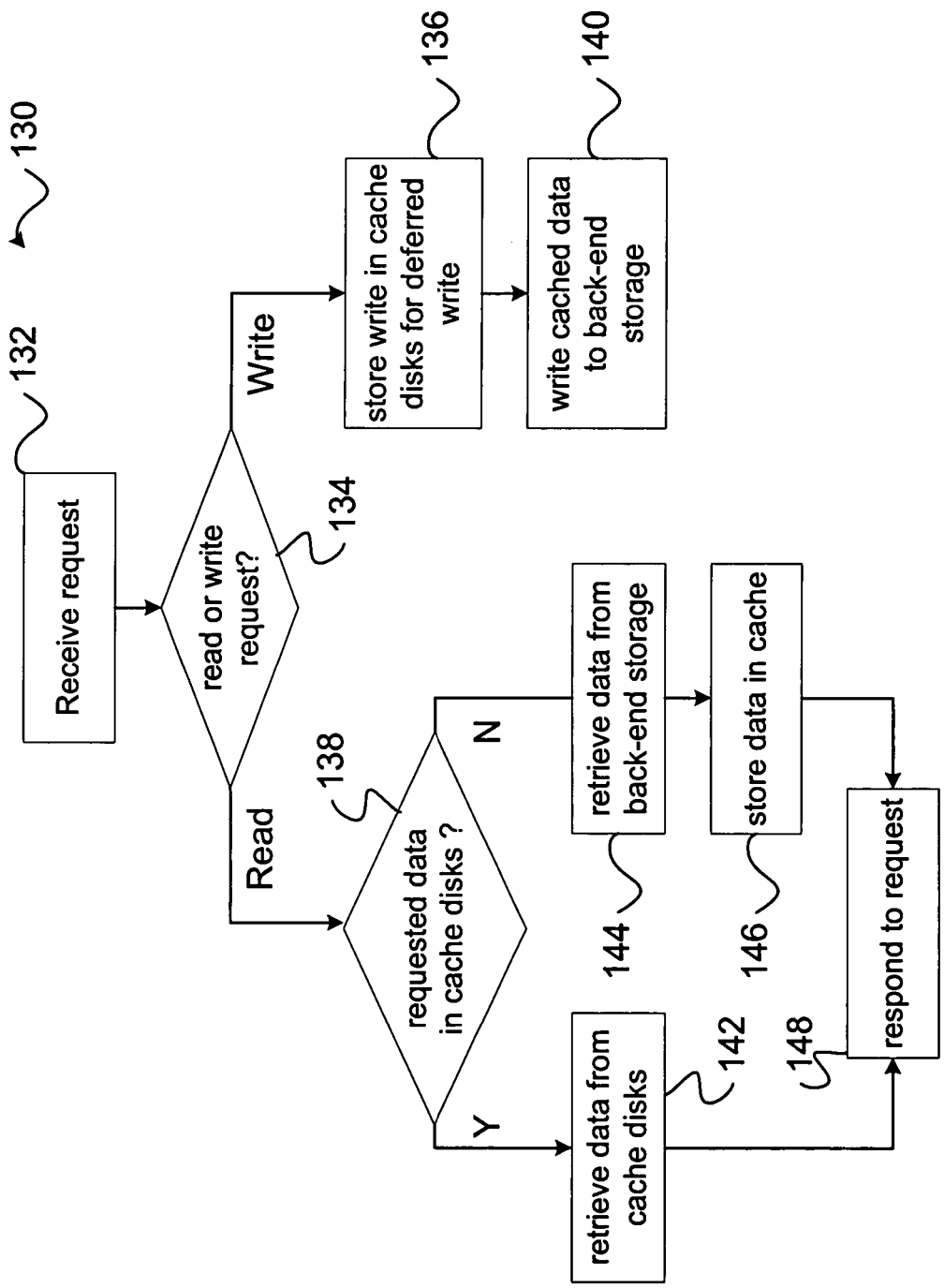
FIG. 2 is a flow-chart of a sample process implemented by a cache.

FIG. 2 illustrates a sample caching process 130 that uses a collection of disks. For write requests, the process 130 can store 136 data in the cache disks for subsequent writing 140 to back-end storage.

For read requests, the cache determines 138 whether the requested data is already stored in the cache disks. If so, the cache can retrieve 142 the requested data without involvement of the back-end storage. If not, the cache can retrieve 144 the data from back-end storage and store 146 the retrieved data in the cache disks, for example, using a RAID or other storage technique. The caching approach depicted in FIG. 2 is merely illustrative. That is, the cache may use a different algorithm to determine whether to cache data. For example, other algorithms may cache based on a history of requests instead of the most recent.

Again, the cache may perform a number of other caching tasks not shown in FIG. 2. For example, The cache 100 may periodically or on an as-needed basis remove cached data, for example, using an LRU (Least Recently Used) algorithm. Additionally, the cache may store tag data identifying the back-end storage addresses stored by the cache and the location of the corresponding blocks within the cache disks. This tag data may be stored on the cache disks or on some other storage device, for example, upon detecting a power failure. The tag data enables a data storage system to recover after a failure, for example, by identifying the cache location of deferred writes or other information in the cache.

FIGS. 3 to 7 show an example of cache 100 operation. As shown, the cache 100 services I/O requests for blocks of back-end storage 102. As shown, the back-end storage 102 features an address space 206 of data storage ranging from address "00000000" to "FFFFFFFF". One or more back-end storage 102 disks may provide the disk storage identified by this address space 206.

Figure 3:
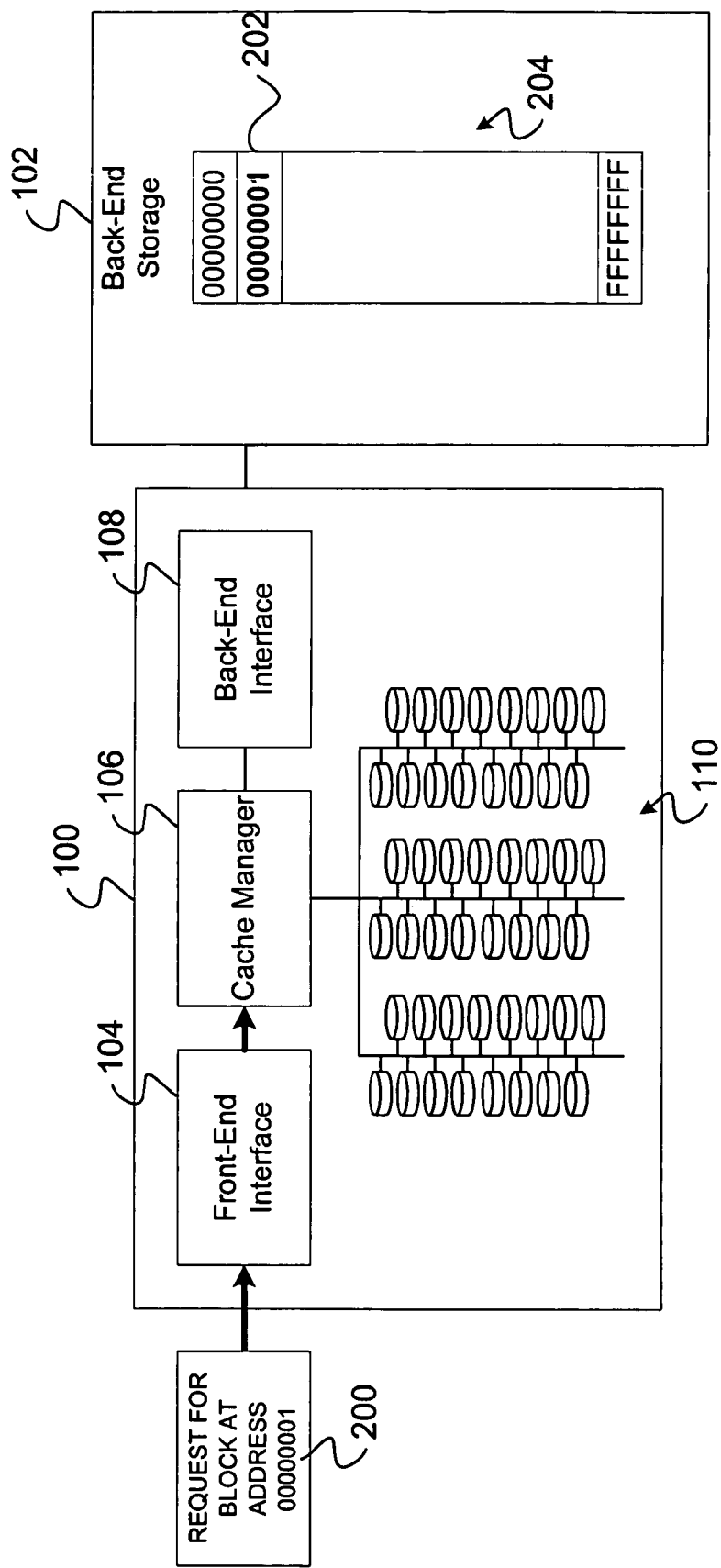
FIGS. 3–7 are diagrams illustrating operation of a cache.
Figure 4:
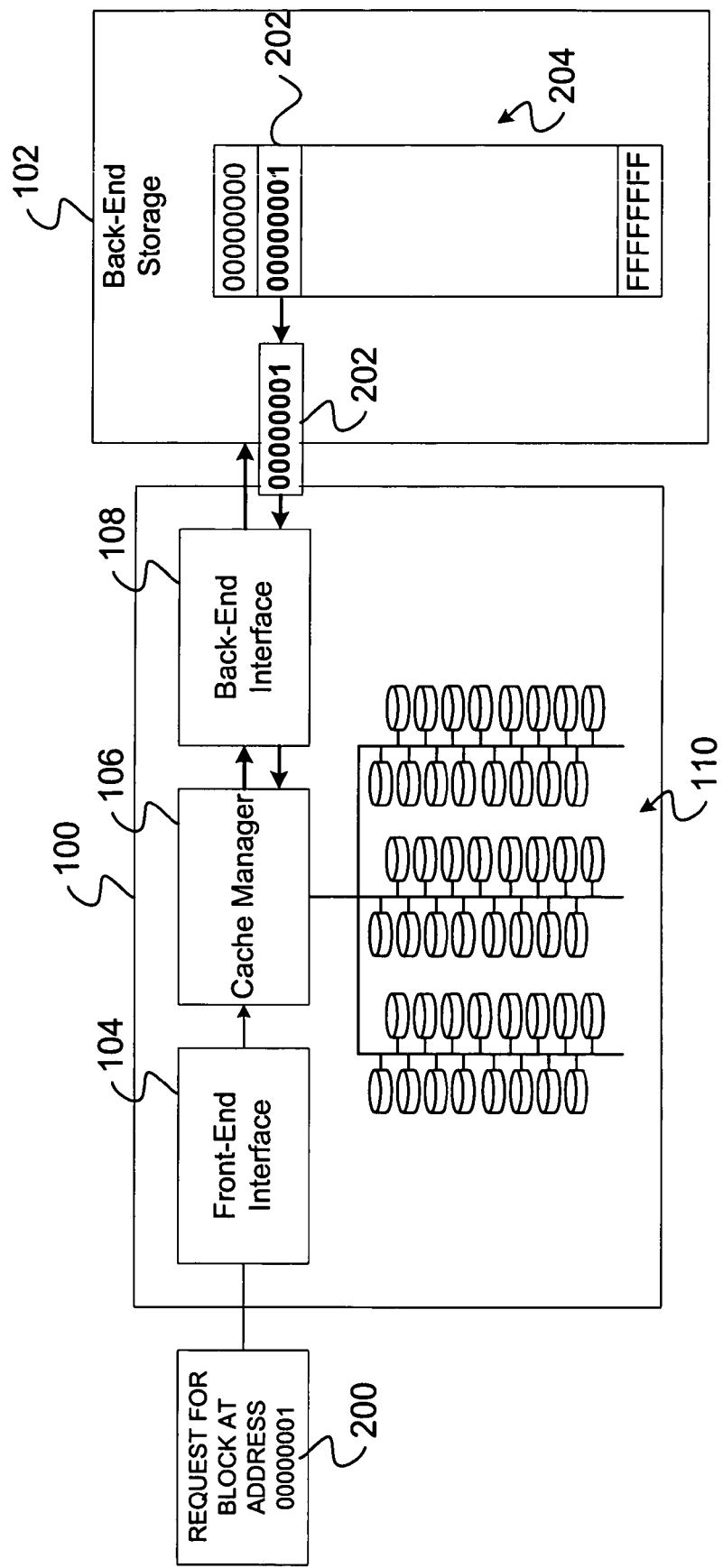
Figure 5:
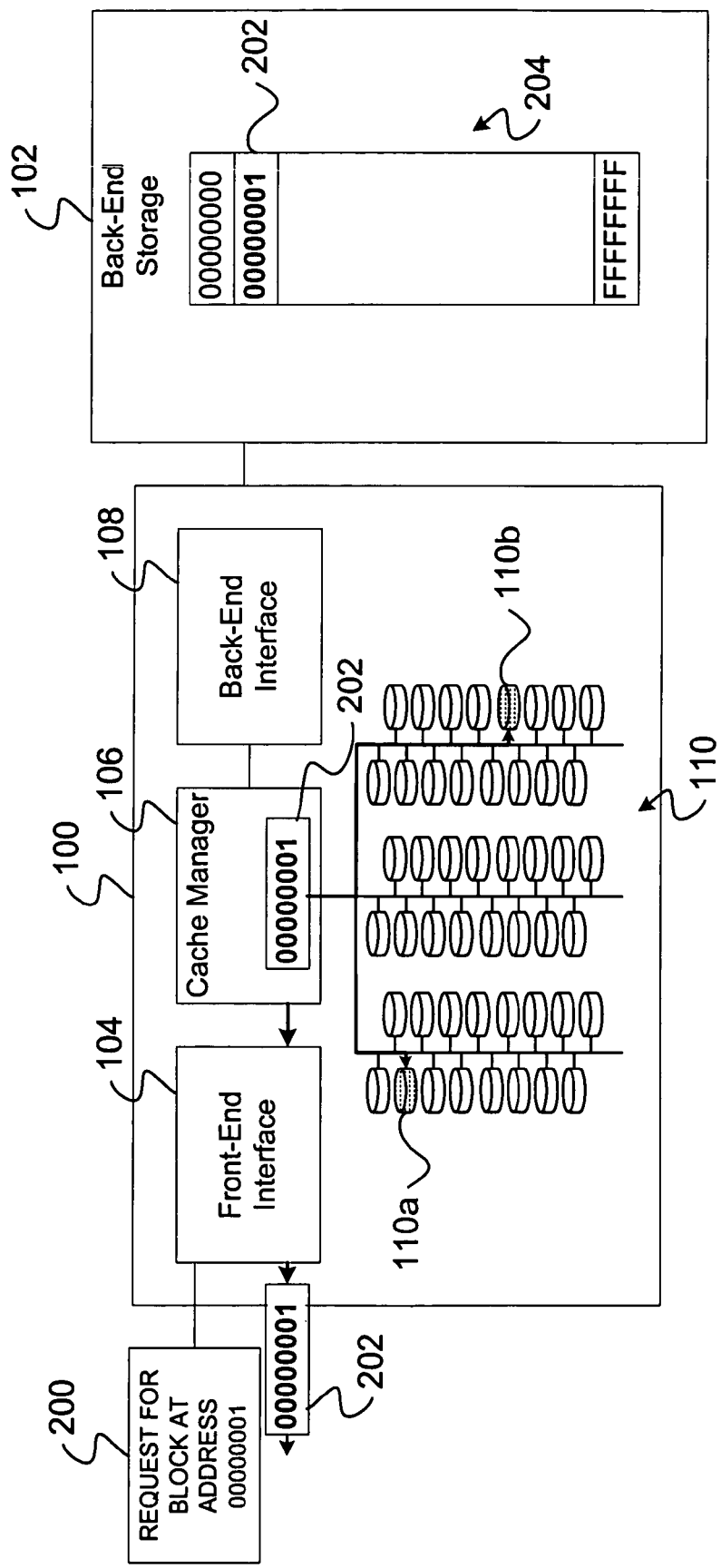
Figure 6:
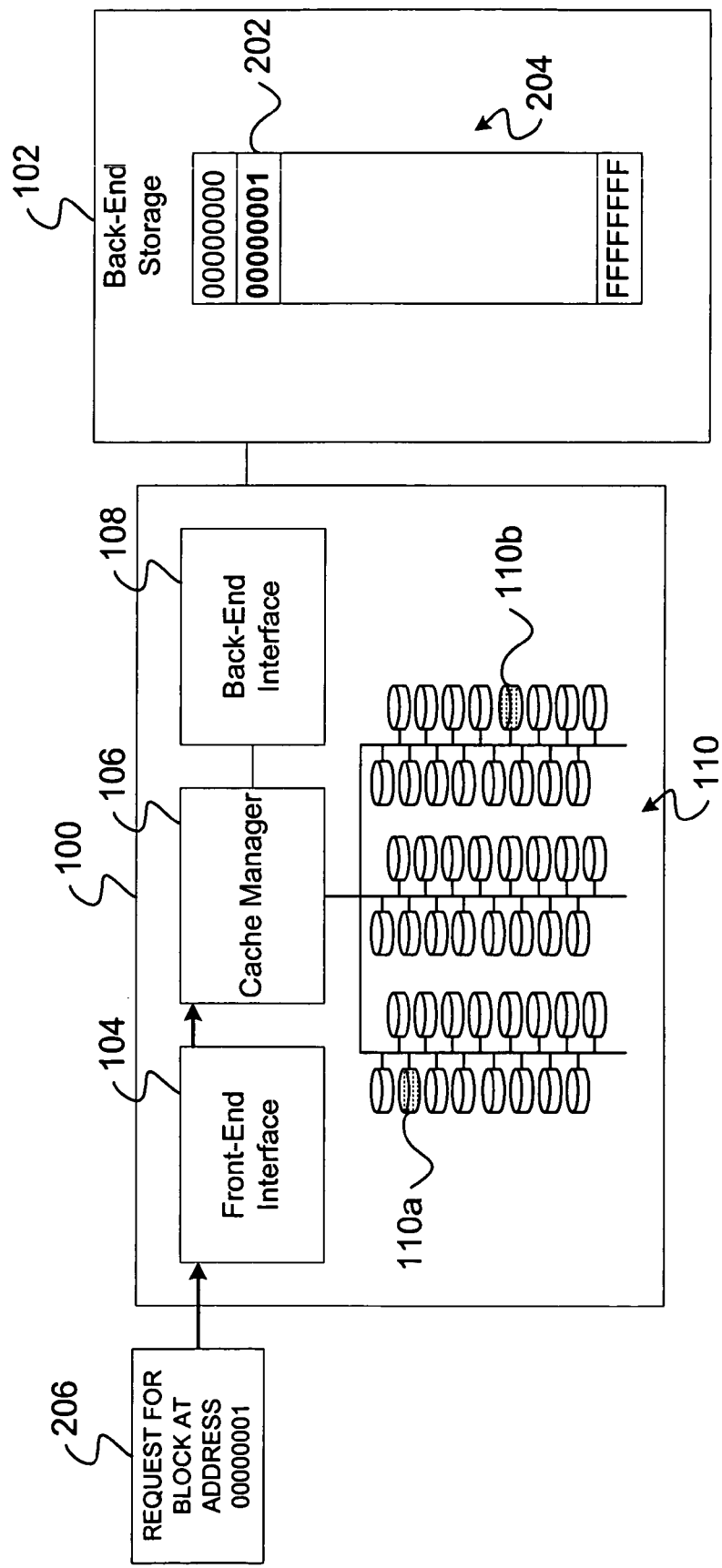
Figure 7:
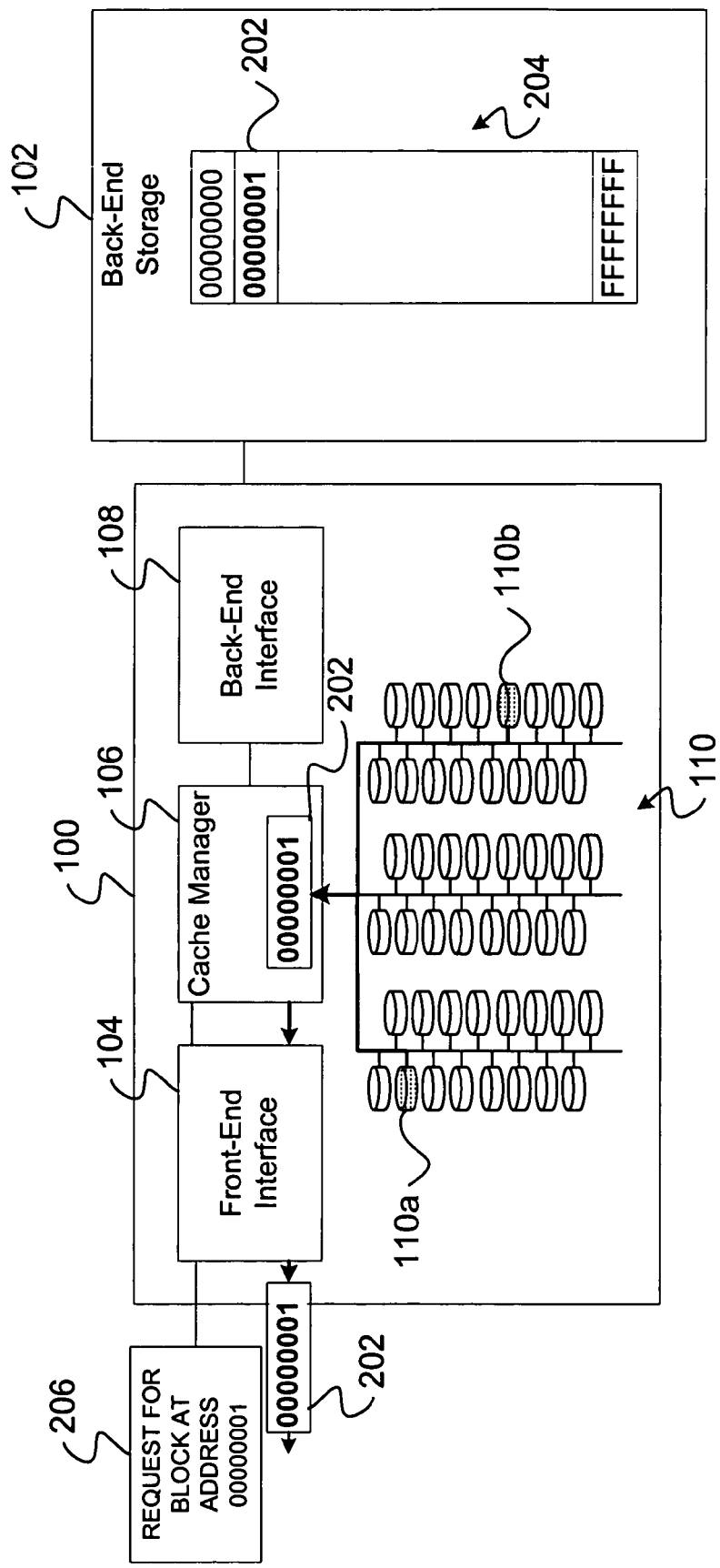

As shown in FIG. 3, the cache 100 receives an I/O request 200 for the back-end storage 102 block 202 specified by data storage address, "00000001". As shown in FIG. 4, after the cache manager 106 determines that the cache disks 110 do not currently store the requested block 202, the cache manager 106 instructs the back-end interface 108 to retrieve the block 202 from back-end storage 102. As shown in FIG. 5, the cache manager 106 stores the retrieved block 202 in the cache disks 110. As shown, the cache manager 106 has divided storage of the block between disks 110a and 110b (shaded). The cache manager 106 also causes the front-end interface to respond to the request 200 with the retrieved block 202. When the cache 100 receives a request for the same block (shown in FIG. 6), the cache 100 can quickly respond to the request by retrieving the block from disks 110a and 110b, as shown in FIG. 7.

Figure 8:
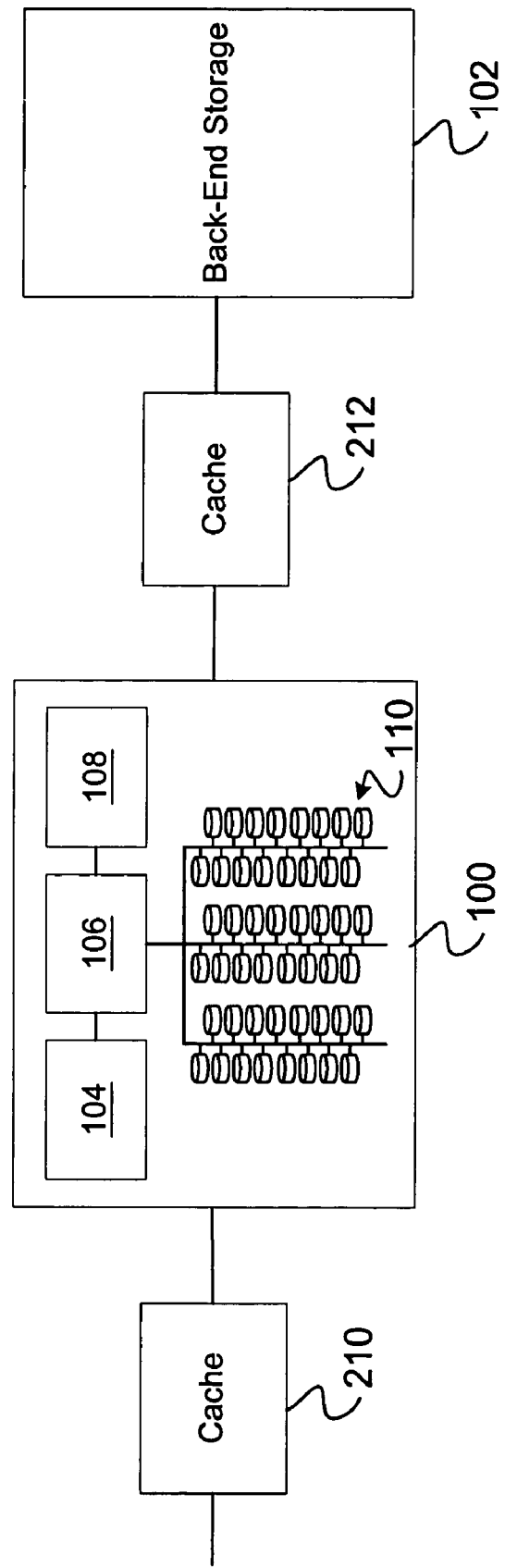
FIG. 8 is a diagram illustrating a series of caches.

As shown in FIG. 8, the cache 100 may be one of a series of caches 210, 100, 212. For example, cache 210 may initially receive an I/O request for a block of data. If the cache 210 does not currently store the requested block, the cache 210 may send a request to cache 100. Similarly, if cache 100 does not currently store the requested block, the cache 100 may send a request to cache 212, and so forth, until a cache or back-end storage 102 provides the requested block.

A cache may feature its own address space. Generally, such address spaces will increase along the chain of caches 210, 100, 212. Potentially, caches may have knowledge of other cache's address spaces. Thus, a request between caches may feature an address of a cache's address space instead of a back-end storage address space.

The techniques described herein are not limited to a particular hardware or software configuration and may find applicability in a wide variety of computing or processing environments. The techniques may be implemented in hardware or software, or a combination of the two. Preferably, the techniques are implemented in computer programs executed by a cache processor and a storage medium readable by the processor (including volatile and non-volatile memory and/or storage elements).

Each program may be implemented in high level procedural or object oriented programming language to communicate with a computer system. However, the programs can be implemented in assembly or machine language, if desired. In any case the language may be compiled or interpreted language. Each such computer program may be stored on a storage medium or device (e.g., ROM, CD-ROM, or hard disk) that is readable by a programmable processor.

Other embodiments are within the scope of the following claims.

What is claimed is:

1. A cache, comprising:
   a front-end interface that receives data access requests that specify respective data storage addresses;
   a back-end interface that can retrieve data identified by the data storage addresses;
   cache storage formed by at least two disks; and
   a cache manager that services at least some of the requests received at the front-end interface using data stored in the cache storage;
   the cache manager being configured to receive a write request to store data and, in response to the write request, split that data into data portions and separately store the data portions on respective disks of the cache storage;
   the cache manager being further configured to receive a read request to read the data and, in response to the read request, concurrently read the data portions which are separately stored on the respective disks of the cache storage to retrieve the data;
   the cache storage providing, as an initial caching capacity of the cache storage, a first cache storage size; and
   the cache storage providing, as a subsequent caching capacity of the cache storage, a second cache storage size in response to addition of a new disk to the cache storage, the second cache storage size being larger than the first cache storage size,
   the cache storage being configured to provide, as an initial caching capacity of the cache storage, a first cache storage size; and
   the cache storage being configured to provide, as a subsequent caching capacity of the cache storage, a second cache storage size in response to addition of a new disk to the cache storage, the second cache storage size being larger than the first cache storage size.

2. The cache of claim 1, wherein the front-end interface comprises an interface confirming to a protocol.

3. The cache of claim 2, wherein the protocol comprises at least one of the following: SCSI (Small Computer System Interface), Fibre Channel, INFINIBAND, and IDE (Integrated Device Electronics).

4. The cache of claim 1, wherein the disks comprise disks having platters less than 3.5 inches in diameter.

5. The cache of claim 4, wherein the disks comprise disks having at least one of the following platter sizes: 2.5 inches, 1.8 inches, and 1 inch in diameter.

6. The cache of claim 1, wherein the cache implements a RAID (Redundant Array of Independent Disks) scheme using the disks.

7. The cache of claim 1, wherein the cache performs at least one of the following operations: requesting data from a back-end storage system, retrieving requested data from the disks, sending data to the back-end system for writing, determining the location of back-end system data within the disks, and removing data from the disks.

8. The cache of claim 1, wherein the addresses specify storage locations of a back-end storage system that includes a collection of one or more disks.

9. The cache of claim 1, wherein the requests comprise I/O (Input/Output) requests.

10. The cache of claim 1, wherein the data storage addresses comprise data storage addresses within an address space.

11. The cache of claim 10, wherein the address space comprises an address space of back-end storage.

12. The cache of claim 10, wherein the address space comprises an address space of a different cache.

13. The cache of claim 1, wherein the cache storage comprises cache storage having more than one disk spindle.

14. The cache of claim 1, wherein said cache further comprises at least one interface conforming to a protocol to allow at least one additional disk to be connected to said cache storage.

15. The cache of claim 1, where said identification data corresponds to cache locations of deferred writes.

16. The cache of claim 1 wherein the cache manager, when responding to the read request, is configured to:
   (i) receive the read request from another cache device connected to the cache in series as part of a cache hierarchy in response to a cache miss at the other cache device, the cache miss involving a failure of the other cache device to provide cached data corresponding to an address of the cache storage;
   (ii) obtaining the data portions which are separately stored on the respective disks from the cache storage in response to the read request; and
   (iii) providing the obtained data portions to the other cache device to satisfy the read request.

17. A method of servicing data access requests at a cache, the method comprising:
   receiving the data access requests at the cache, the cache having cache storage formed by at least two disks, the requests specifying respective data storage addresses; and
   servicing at least some of the requests using data stored in the disks;
   where receiving the data access requests includes receiving a write request to store data, where servicing at least some of the requests includes splitting that data into data portions and separately storing the data portions on respective disks of the cache storage in response to the write request;
   where the cache storage provides, as an initial caching capacity of the cache storage, a first cache storage size; and where the method further comprises:
   adding a new disk to the cache storage to provide, as a subsequent caching capacity of the cache storage, a second cache storage size, the second cache storage size being larger than the first cache storage size,
   where receiving the data access requests further includes receiving a read request to read the data, and where servicing at least some of the requests further includes concurrently reading the data portions which are separately stored on the respective disks of the cache storage to retrieve the data in response to the read request;
   where the cache storage is configured to provide, as an initial caching capacity of the cache storage, a first cache storage size; and where the method further comprises:
   adding a new disk to the cache storage to provide, as a subsequent caching capacity of the cache storage, a second cache storage size, the second cache storage size being larger than the first cache storage size.

18. The method of claim 17, wherein the requests comprise requests conforming to a protocol.

19. The method of claim 18, wherein the protocol comprises at least one of the following: SCSI, Fibre Channel, INFINIBAND, and IDE.

20. The method of claim 17, wherein the requests comprise at least one read request.

21. The method of claim 17, wherein servicing the requests comprises retrieving data from the back-end storage and storing the data in at least one of the disks.

22. The method of claim 21, wherein storing the data comprises storing the data in accordance with a RAID scheme.

23. The method of claim 17, wherein servicing the requests comprises determining whether the collection of disks currently stores the requested data.

24. The method of claim 17, wherein the data storage addresses comprise data storage addresses within an address space.

25. The method of claim 24, wherein the address space comprises an address space of a back-end system formed by a collection of disks.

26. The method of claim 17, where said identification data corresponds to cache locations of deferred writes.

27. The method of claim 17 wherein receiving the read request includes acquiring the read request from another cache device connected to the cache in series as part of a cache hierarchy in response to a cache miss at the other cache device, the cache miss involving a failure of the other cache device to provide cached data corresponding to an address of the cache storage; and
   wherein concurrently reading the data portions includes obtaining the data portions which are separately stored on the respective disks from the cache storage in response to the read request, and providing the obtained data portions to the other cache device to satisfy the read request.

28. A data storage system, comprising:
   a back-end storage system having an address space, addresses in the address space identifying blocks of storage; and
   a cache for the back-end storage system having a lesser storage capacity than the back-end storage system, the cache including:
   a front-end interface that receives I/O (Input/Output) requests that specify respective addresses of back-end storage blocks;
   a back-end interface that communicates with the back-end storage system;
   cache storage formed by at least two disks having platter diameters less than 3.5 inches; and
   a cache manager that services at least some of the I/O requests received via the front-end interface using blocks temporarily stored in the cache storage;
   the cache manager being configured to receive a write request to store data and, in response to the write request, split that data into data portions and separately store the data portions on respective disks of the cache storage;
   the cache manager being further configured to receive a read request to read the data and, in response to the read request, concurrently read the data portions which are separately stored on the respective disks of the cache storage to retrieve the data;
   the cache storage providing, as an initial caching capacity of ht e cache storage, a first cache storage size; and
   the cache storage providing, as a subsequent caching capacity of the cache storage, a second cache storage size in response to addition of a new disk to the cache storage, the second cache storage size being larger than the first cache storage size, the cache storage being configured to provide, as an initial caching capacity of the cache storage, a first cache storage size; and the cache storage being configured to provide, as a subsequent caching capacity of the cache storage, a second cache storage size in response to addition of a new disk to the cache storage, the second cache storage size being larger than the first cache storage size.

29. The data storage system of claim 28, wherein said cache further comprises at least one interface conforming to a protocol to allow at least one additional disk to be connected to said cache storage.

30. The data storage system of claim 28, where said identification data corresponds to cache locations of deferred writes.

31. The data storage system of claim 28 wherein the cache manager, when responding to the read request, is configured to:
   (i) receive the read request from another cache device connected to the cache in series as part of a cache hierarchy in response to a cache miss at the other cache device, the cache miss involving a failure of the other cache device to provide cached data corresponding to an address of the cache storage;
   (ii) obtaining the data portions which are separately stored on the respective disks from the cache storage in response to the read request; and
   (iii) providing the obtained data portions to the other cache device to satisfy the read request.

32. A data storage system, comprising:
   a back-end storage system having a back-end address space, addresses in the address space identifying blocks of storage; and
   a plurality of caches for the back-end storage system, each of said plurality of caches having a lesser storage capacity than the back-end storage system, each of said plurality of caches including:
      a front-end interface that receives I/O (Input/Output) requests that specify respective addresses of back-end storage blocks;
      a back-end interface capable of communicating with one of back-end storage system and another of one of said plurality of caches;
      cache storage formed by at least two disks, said cache storage having a respective cache storage address space; and
      a cache manager that services at least some of the I/O requests received via the front-end interface using blocks temporarily stored in the data storage system, said at least some of the I/O requests corresponding to addresses in said respective cache storage address space of at least some of said plurality of caches;
      the cache manager being configured to receive a write request to store data and, in response to the write request, split that data into data portions and separately store the data portions on respective disks of the cache storage;
      the cache manager further being configured to receive a read request to read the data and, in response to the read request, concurrently read the data portions which are separately stored on the respective disks of the cache storage to retrieve the data;
      the cache storage providing, as an initial caching capacity of the cache storage, a second cache storage size in response to addition of a new disk to the cache storage, the second cache storage size being larger than the first cache storage size,
   the cache manager being configured to receive a write request to store data and, in response to the write request, split that data into data portions and separately store the data portions on respective disks of the cache storage;
   the cache manager being further configured to receive a read request to read the data and, in response to the read request, concurrently read the data portions which are separately stored on the respective disks of the cache storage to retrieve the data;
   the cache storage being configured to provide, as an initial caching capacity of the cache storage, a first cache storage size; and
   the cache storage being configured to provide, as a subsequent caching capacity of the cache storage, a second cache storage size in response to addition of a new disk to the cache storage, the second cache storage size being larger than the first cache storage size.

33. The data storage system of claim 32, wherein:
   said plurality of caches are connected in series such that the front-end interface of one of said of plurality of caches is coupled to the back-end interface of another of said plurality of caches;
   the front end interface of one of said plurality of caches is coupled to a device making said I/O requests; and,
   the back-end interface of one of said plurality of caches is coupled to said back-end storage system.

34. The data storage system of claim 33, wherein upon receiving one of I/O requests at said front-end interface of one of said plurality of caches, the cache manager of said one of plurality of caches sends data corresponding to said one of I/O requests to said device making said one of I/O requests if said data is stored on the cache storage of said one of plurality of caches.

35. The data storage system of claim 33, wherein upon receiving one of I/O requests at said front-end interface of one of said plurality of caches, the cache manager of said one of plurality of caches sends said one of I/O requests to one of back-end storage and another of said plurality of caches coupled to the back-end-interface of said one plurality of caches if said data is not stored on the cache storage of said one of plurality of caches.

36. The data storage system of claim 32, wherein each of said plurality of caches further comprises at least one interface conforming to a protocol to allow at least one additional disk to be connected to said cache storage.

37. The data storage system of claim 32, where said identification data corresponds to cache location of differed writes.

* * * * *

UNITED STATES PATENT AND TRADEMARK OFFICE
CERTIFICATE OF CORRECTION

PATENT NO. : 6,973,537 B1
DATED : December 6, 2005
INVENTOR(S) : Mike Kowalchik and John Cardente It is certified that error appears in the above-identified patent and that said Letters Patent is hereby corrected as shown below:

Title page,
Item [57], ABSTRACT,
Line 27, "that includes interface" should read -- that includes a front-end interface --.

Column 8,
Line 64, "hte" should read -- the --.

Signed and Sealed this

Fourteenth Day of February, 2006

JON W. DUDAS
*Director of the United States Patent and Trademark Office*